(12) United States Patent
Itabashi et al.

(10) Patent No.: US 8,834,836 B2
(45) Date of Patent: Sep. 16, 2014

(54) METHOD FOR PRODUCING MTW-TYPE ZEOLITE

(75) Inventors: Keiji Itabashi, Tokyo (JP); Yoshihiro Kamimura, Tokyo (JP); Tatsuya Okubo, Tokyo (JP)

(73) Assignee: Unizeo Co., Ltd, Tokyo (JP)

( * ) Notice: Subject to any disclaimer, the term of this patent is extended or adjusted under 35 U.S.C. 154(b) by 0 days.

(21) Appl. No.: 13/980,765

(22) PCT Filed: Jan. 17, 2012

(86) PCT No.: PCT/JP2012/050780
§ 371 (c)(1),
(2), (4) Date: Sep. 10, 2013

(87) PCT Pub. No.: WO2012/102120
PCT Pub. Date: Aug. 2, 2012

(65) Prior Publication Data
US 2013/0343986 A1 Dec. 26, 2013

(30) Foreign Application Priority Data
Jan. 27, 2011 (JP) .................. 2011-014808

(51) Int. Cl.
*C01B 33/36* (2006.01)
*C01B 39/00* (2006.01)
*C01B 39/42* (2006.01)
*C01B 39/46* (2006.01)

(52) U.S. Cl.
CPC ............... *C01B 39/46* (2013.01); *C01B 39/42* (2013.01)
USPC .......................................... 423/709; 423/710

(58) Field of Classification Search
CPC .... C01B 33/2853; C01B 39/48; C01B 39/02; C01B 33/2838; C01B 33/46; C01B 33/2815; B01J 29/40; B01J 29/08; C11D 3/128
USPC .................................................. 423/709, 710
See application file for complete search history.

(56) References Cited

PUBLICATIONS

Loiha, S. et al., "Synthesis of zeolite beta with pretreated rice husk silica and its transformation to ZSM-12", Materials Chemistry and Physics (2009), vol. 115, pp. 637-640. (Cited in ISR dated Apr. 24, 2012).
Kamimura, Y. et al., "Shukessho Tenkaho ni yoru OSDA-free MTW-gata Zeolite no Gosei to sono Tokusei", Dai 26 Kai Zeolite Kenkyu Happyokai Koen Yokoshu, 2010, p. 19, 2. Jikken. (Cited in ISR dated Apr. 24, 2012).
International Search Report of PCT/JP2012/050780, dated of mailing Apr. 24, 2012 (with English translation, 2 pages).

*Primary Examiner* — Bijay Saha
(74) *Attorney, Agent, or Firm* — Westerman, Hattori, Daniels & Adrian, LLP

(57) ABSTRACT

Provided is a method for producing an MTW-type zeolite. The reaction mixture contains a silica source, an alumina source, an alkali source, and water is reacted with a seed crystal of a zeolite to produce an MTW-type zeolite. The reaction mixture has a composition, which makes a synthesized zeolite contain an MFI-type zeolite when the zeolite is synthesized solely from the reaction mixture, is used. As the seed crystal, a beta-type zeolite which has a ratio of $SiO_2/Al_2O_3$ of 8 to 50 and does not contain a structure direction agent is used. The seed crystal is added to the reaction mixture, in a proportion of 0.1% by mass to 20% by mass based on a silica component in the reaction mixture. The reaction mixture to which the seed crystal has been added is heated at 100° C. to 200° C. in a sealed state.

6 Claims, 3 Drawing Sheets

US 8,834,836 B2

METHOD FOR PRODUCING MTW-TYPE ZEOLITE

TECHNICAL FIELD

The present invention relates to a method for producing an MTW-type zeolite from a reaction mixture not containing a structure directing agent.

BACKGROUND ART

A synthetic zeolite is crystalline aluminosilicate and has uniform pores of angstrom size due to the crystal structure thereof. By utilizing such characteristics, the synthetic zeolite is being used in the industrial field, as a molecular sieve adsorber that adsorbs only the molecules having a certain size, an adsorptive separating agent that adsorbs the molecules having strong affinity, or a base of a catalyst. The "MTW-type zeolite" as a type of synthetic zeolite is a name that represents the type of a framework structure imparted to a zeolite ZSM-12, and zeolites having the same structure include CZH-5, NU-13, TPZ-12, Theta-3, VS-12, and the like. Currently, the MTW-type zeolite is being used in a large amount in the world as a catalyst in the field of petrochemical industry. The MTW-type zeolite is characterized by having 12-membered one-dimensional pores.

Conventionally, the MTW-type zeolite is produced by only a method of using organic ammonium ions as a structure directing agent (hereinafter, abbreviated to "SDA"). Accordingly, the use of SDA has been considered to be necessary for obtaining the MTW-type zeolite. Moreover, since the synthesized MTW-type zeolite contains the SDA, it has been considered that the MTW-type zeolite is necessarily baked before use so as to remove the SDA.

Various synthesis methods of the MTW-type zeolite have been proposed. As a general method, there is a method of using organic ammonium ions, such as tetraethyl ammonium ion, methyl triethyl ammonium ions, or benzyl triethyl ammonium ions, as SDA. In addition, it is also necessary to add ions of alkaline metals such as sodium or lithium. The method is disclosed in, for example, the following PTLs 1 to 3. According to those methods, an MTW-type zeolite having a ratio of $SiO_2/Al_2O_3$ of 20 or higher is obtained. However, the SDA is expensive, and sometimes most of the SDA in a mother liquor is decomposed after crystallization of the MTW-type zeolite ends. Furthermore, since the SDA is intermixed with the generated zeolite crystals, the zeolite needs to be baked to remove the SDA if the zeolite is used as an adsorbent or a catalyst. At this time, the exhaust gas thereof is the cause of environmental contamination, and in order to perform detoxifying treatment on the synthesized mother liquor containing a decomposition product of the SDA, a large amount of chemical is required. In this way, the synthesis method of an MTW-type zeolite that uses the SDA costs a lot and causes a heavy environmental load. Accordingly, there is a demand for the realization of a production method not using the SDA and an MTW-type zeolite that is obtained from the production method not using the SDA and basically does not contain the SDA.

CITATION LIST

Patent Literature

[PTL 1] JP-B-52-16079
[PTL 2] JP-B-63-31406
[PTL 3] JP-A-60-264320

SUMMARY OF INVENTION

Technical Problem

An object of the present invention is to provide a method for producing an MTW-type zeolite basically not containing an SDA, that is, a method that can reduce the environmental load as much as possible by solving the problems of the conventional technique described above and can produce an MTW-type zeolite at low cost without using an SDA.

Solution to Problem

The present invention provides a method for producing an MTW-type zeolite by reacting a reaction mixture containing a silica source, an alumina source, an alkali source, and water with a seed crystal of a zeolite, including:

adding the seed crystal to the reaction mixture, in a proportion of 0.1% by mass to 20% by mass based on a silica component in the reaction mixture; and heating the reaction mixture to which the seed crystal has been added, at 100° C. to 200° C. in a sealed state, in which as the reaction mixture, a reaction mixture having a composition which makes a synthesized zeolite contain an MFI-type zeolite when the zeolite is synthesized solely from the reaction mixture is used, and as the seed crystal, a beta-type zeolite that has a ratio of $SiO_2/Al_2O_3$ of 8 to 50 and does not contain a structure directing agent is used.

Advantageous Effects of Invention

According to the present invention, an MTW-type zeolite is produced from a reaction mixture not using an SDA. Therefore, the obtained MTW-type zeolite fundamentally does not contain the SDA. Accordingly, the MTW-type zeolite does not need to be subjected to baking treatment before use. Moreover, even if the MTW-type zeolite is subjected to dehydration treatment, an organic substance is not produced, and accordingly, exhaust gas does not need to be treated. Therefore, according to the present invention, an MTW-type zeolite that causes a light environmental load can be produced at low cost.

DESCRIPTION OF EMBODIMENTS

In the production method of the present invention, the seed crystal of a zeolite is added to gel of a reaction mixture to obtain an MTW-type zeolite based on the seed crystal. As the reaction mixture, a reaction mixture having a composition, which makes a synthesized zeolite contain an MFI-type zeolite when the zeolite is synthesized solely from the reaction mixture, is used. As the seed crystal of a zeolite, a beta-type zeolite is used. In this way, the production method of the present invention seems to use a zeolite irrelevant to an MTW-type zeolite to generate a target MTW-type zeolite. However, the present inventors found that the beta-type zeolite as a seed crystal, the MFI-type zeolite as a zeolite that is synthesized solely from the reaction mixture, and the target MTW-type zeolite are closely connected to one another in the concept of a composite building unit. This point will be described below.

Figure 1:
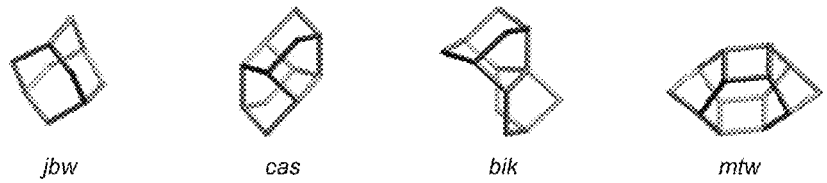
FIGS. 1(a) to 1(c) are views showing composite building units of an MTW-type zeolite, an MFI-type zeolite, and a beta-type zeolite.
Figure 1:
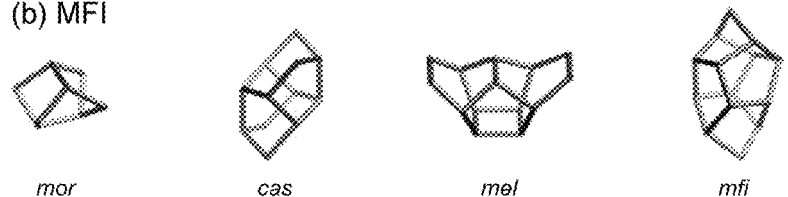
Figure 1:

It has been demonstrated that the zeolite known so far has a framework structure constituted with a combination of three-dimensional basic structures. This basic structure is called a composite building unit, and 47 types thereof have been known so far. The International Zeolite Association denotes each of the composite building units with a code using three lowercase letters of alphabets. For example, the MTW-type zeolite has a framework structure constituted with a combination of four composite building units that are jbw, cas, bik, and mtw, as shown in FIG. 1(a). The MFI-type zeolite has a framework structure constituted with a combination of four composite building units that are mor, cas, mel, and mfi, as shown in FIG. 1(b). The beta-type zeolite has a framework structure constituted with a combination of three composite building units that are mor, bea, and mtw, as shown in FIG. 1(c). The composite building units constituting the framework structure of the respective zeolites are disclosed in "Atlas of Zeolite Framework Types", 6$^{th}$ Revised Edition 2007, Structure Commission of the International Zeolite Association. The composite building units are obtained by geometrically classifying basic units constituting the framework structure of zeolites. Keep in mind that there is no compound having the structure of the composite building unit.

Figure 2:
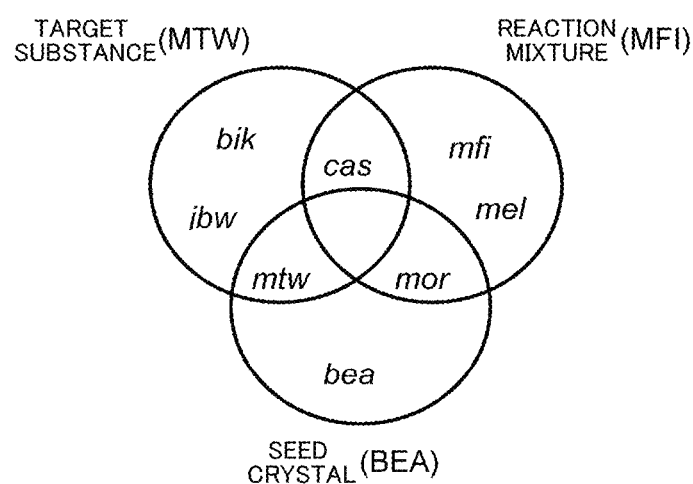
FIG. 2 is a view showing the relationship between composite building units of an MTW-type zeolite, an MFI-type zeolite, and a beta-type zeolite.

FIG. 2 shows the relationship among the composite building units of the respective zeolites shown in FIGS. 1(a) to 1(c). FIG. 2 clearly shows that the composite building unit forming the framework structure of the MTW-type zeolite as a target substance shares cas with the composite building unit forming the framework structure of the MFI-type zeolite which is generated solely from the reaction mixture. On the other hand, the composite building unit forming the framework structure of the MTW-type zeolite as a target substance shares mtw with the composite building unit forming the framework structure of the beta-type zeolite as a seed crystal. To summarize, in the present invention, from the reaction mixture of the MFI-type zeolite which is a zeolite containing cas as a composite building unit and the seed crystal of the beta-type zeolite which is a zeolite containing mtw as a composite building unit, the MTW-type zeolite which is a zeolite containing cas and mtw as composite building units is synthesized. In this way, in the present invention, a portion of the composite building unit forming the framework structure of a zeolite (a) which is synthesized solely from the reaction mixture is combined with a portion of the composite building unit forming the framework structure of a zeolite (b) of the seed crystal, whereby a zeolite (c) having a framework structure containing the composite building units of both the zeolites is synthesized. Herein, the zeolites (a), (b), and (c) are different types of zeolites.

As described above, the production method of the present invention has been made on the basis of an idea that a zeolite is synthesized based on the concept of a composite building unit forming the framework structure of the zeolite, and the idea is a definitely novel idea that has not been existed so far. In addition, according to this idea, an advantageous effect, which makes it possible to easily synthesize an MTW-type zeolite even under a condition in which the reaction mixture does not contain an SDA, is produced.

As described above, as the reaction mixture used in the present invention, a reaction mixture having a composition which makes a zeolite synthesized by heating the reaction mixture alone contain an MFI-type zeolite is used. Such a reaction mixture is obtained by mixing a silica source with an alumina source, an alkali source, and water, and does not contain an SDA. An example of a preferable composition of the reaction mixture is as follows.
$SiO_2/Al_2O_3$=10 to 150
$Na_2O/SiO_2$=0.075 to 0.23
$H_2O/SiO_2$=5 to 50
A more preferable range of the composition of the reaction mixture is as follows.
$SiO_2/Al_2O_3$=30 to 120
$Na_2O/SiO_2$=0.1 to 0.2
$H_2O/SiO_2$=8 to 20

Examples of the silica source include silica itself and silicon-containing compounds that can generate silicate ions in water. Specific examples thereof include wet-method silica, dry-method silica, colloidal silica, sodium silicate, aluminosilicate gel, and the like. One kind of these silica sources can be used alone, or two or more kinds thereof can be used in combination. It is preferable to use silica (silicon dioxide) among these silica sources, since it is possible to obtain a target zeolite without producing an unnecessary by-product.

As the alumina source, for example, water-soluble aluminum-containing compounds can be used. Specific examples thereof include sodium aluminate, aluminum nitrate, aluminum sulfate, and the like. Moreover, aluminum hydroxide is also one of the preferable alumina sources. One kind of these alumina sources can be used alone, or two or more kinds thereof can be used in combination. It is preferable to use sodium aluminate or aluminum hydroxide among these alumina sources, since it is possible to obtain a target zeolite without producing unnecessary by-products (for example, sulfate or nitrate).

As the alkali source, for example, sodium hydroxide can be used. In addition, when sodium silicate is used as the silica source or when sodium aluminate is used as the alumina source, sodium as an alkaline metal component contained in the above sources is regarded as NaOH as well and also is an alkaline component. Accordingly, the amount of the $Na_2O$ is calculated as the total amount of all alkaline components in the reaction mixture.

For preparing the reaction mixture, a method may be employed in which the respective raw materials are added in such order that makes it possible to easily obtain a uniform reaction mixture. For example, an alumina source is added to and dissolved in an aqueous sodium hydroxide solution at room temperature, and then a silica source is added thereto, followed by mixing under stirring, whereby a uniform reaction mixture can be obtained. The temperature for preparing the reaction mixture is not particularly limited and may be room temperature (20° C. to 30° C.) in general.

The seed crystal of a beta-type zeolite can be mixed with the reaction mixture while the seed crystal is being added to the silica source during, for example, the process of preparing the reaction mixture. Alternatively, during the process of preparing the reaction mixture, the seed crystal can be added to the reaction mixture, before or after the silica source is added. Moreover, a method of adding the seed crystal after the reaction mixture is matured or temporarily heated. In any cases, the seed crystal is mixed under stirring such that the seed crystal uniformly disperses thereafter.

The seed crystal of a beta-type zeolite that is added to the reaction mixture is selected such that a range of the ratio of $SiO_2/Al_2O_3$ becomes as wide as 8 to 50, and preferably selected such that the range becomes 10 to 30. That is, the freedom in selecting the beta-type zeolite is extremely high. It is extremely difficult to synthesize a beta-type zeolite having a ratio of $SiO_2/Al_2O_3$ of smaller than 8, so such a zeolite is not used in general. If the ratio of $SiO_2/Al_2O_3$ exceeds 50, the product easily becomes ZSM-5 without depending on the composition of the reaction mixture.

The amount of the seed crystal added is within a range of 0.1% by mass to 20% by mass based on the silica component contained in the reaction mixture. The amount added is determined in consideration of the reaction rate, the effect of suppressing impurities, or the like, though the smaller the amount the better. The amount added is preferably 1% by mass to 20% by mass and more preferably 1% by mass to 10% by mass.

The average particle size of the seed crystal of a beta-type zeolite is preferably 150 nm or larger, more preferably 150 nm to 1,000 nm, and even more preferably 200 nm to 600 nm. The size of the zeolite crystal obtained by synthesis is not uniform in general and has a particle size distribution to some extent. It is not difficult to determine a crystal particle size having a maximum frequency in the distribution. The average particle size refers to a crystal particle diameter that is most frequently found by the observation using a scanning electron microscope. Generally, the beta-type zeolite using an organic SDA has a small particle size that is usually within a range of 100 nm to 1,000 nm. However, the particle size is unclear since small particles are aggregated, or there are particles larger than 1,000 nm. In addition, in order to synthesize crystals equal to or smaller than 100 nm, a special device is required, and it costs a lot. Therefore, in the present invention, it is preferable to use a beta-type zeolite having an average particle size of 150 nm or larger as a seed crystal.

Commercially available products may be used as the seed crystal of a beta-type zeolite. Alternatively, a beta-type zeolite that is synthesized by using an SDA and baked for removing the SDA may be used. Moreover, the beta-type zeolite disclosed in Chem. Asian J. 2010, 5, 2182-2191 may be used. The beta-type zeolite disclosed in this document is synthesized without using an SDA, that is, synthesized by a "green process". Accordingly, if this beta-type zeolite is used as a seed crystal in the production method of the present invention, it is possible to synthesize an MTW-type zeolite without using an SDA at all. That is, it is possible to synthesize an MTW-type zeolite by the "green process". In any case of using any type of seed crystal, the seed crystal of a beta-type zeolite does not contain the SDA.

Figure 3:
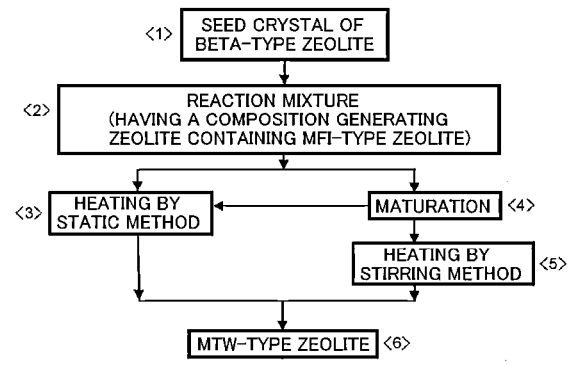
FIG. 3 is a process chart for performing the production method of the present invention.

FIG. 3 is a process chart for performing the production method of the present invention. In the present invention, the production can be performed in order of <1>, <2>, <3>, and <6> in the same chart. If the above order is employed, it is possible to produce an MTW-type zeolite having a wide range of the ratio of $SiO_2/Al_2O_3$. Moreover, the production can also be performed in order of <1>, <2>, <4>, <3>, and <6> in the same chart. If the above order is employed, it is possible to effectively use a seed crystal having a low ratio of $SiO_2/Al_2O_3$ in many cases by performing maturation and then heating the zeolite in a static state.

Moreover, the production can be performed in order of <1>, <2>, <4>, <5>, and <6> in FIG. 3. In this order, the operation of maturation and stirring is performed. The operation of maturation and stirring is a novel method necessary for realizing mass production of the MTW-type zeolite. This is because though a large pressurized container is required for realizing mass production, a stirring operation is indispensible for uniformly maintaining the internal temperature of the pressurized container. However, if stirring is performed without the operation of maturation, impurities are also produced, so the purity easily decreases.

In the above respective orders, the reaction mixture, to which the seed crystal of a beta-type zeolite has been added, is put into a sealed container and reacted by heating, whereby a target MTW-type zeolite is crystallized. The reaction mixture does not contain an SDA.

When a substance having a low ratio of $SiO_2/Al_2O_3$ is used as the seed crystal, crystallization is easily caused if heating is performed after maturation without stirring (order of <1>, <2>, <4>, <3>, and <6>). The maturation refers to an operation of maintaining the temperature for a certain time at a temperature that is lower than the reaction temperature. During the maturation, the reaction mixture is put in a static state without being stirred in general. It is known that if maturation is performed, effects of preventing impurities from being produced as a by-product, making it possible to perform heating under stirring without producing impurities as a by-product, increasing the reaction rate, and the like are produced. However, the mechanism of action thereof is not necessarily clear. The temperature and time for maturation is set such that the above effects are exerted to the maximum degree. In the present invention, the mauration is performed preferably at 20° C. to 100° C., more preferably at 20° C. to 80° C., and even more preferably at 20° C. to 60° C., preferably for 2 hours to 1 day.

When the stirring is performed for uniformize the temperature of the reaction mixture during heating, if the stirring under heating is performed after the materuation, it is possible to prevent impurities from being produced as a by-product (order of <1>, <2>, <4>, <5>, and <6>). Stirring is performed to uniformize the composition and temperature of the reaction mixture, and mixing is performed by a stirring blade, or rotation of the container, and the like. The stirring strength or rotation frequency may be adjusted according to the uniformity of temperature or to how the impurities are produced as a by-product. Stirring may be performed continuously or intermittently. If maturation and stirring are combined with each other in this way, industrial mass production can be realized.

In any of the static method and stirring method, the heating temperature is preferably 100° C. to 200° C. and preferably in a range of from 120° C. to 180° C. The heating is performed under autogeneous pressure, that is, the heating is performed in a sealed state. At a temperature lower than 100° C., the crystallization rate becomes extremely low, so sometimes the efficiency of generating an MTW-type zeolite becomes poor. On the other hand, at a temperature exceeding 200° C., an autoclave having a high degree of pressure resistance is required. Accordingly, the economic efficiency becomes deficient, and impurities are also generated at a high rate. The heating time is not critical in the present production method, and heating may be performed until an MTW-type zeolite having a sufficiently high degree of crystallinity is generated. Generally, if heating is performed for about 5 to 240 hours, an MTW-type zeolite having satisfactory crystallinity is obtained.

In the method for producing an MTW-type zeolite of the present invention, when the heating time is insufficient, amorphous components are also generated. In addition, if heating is further continued after crystallization of the target MTW-type zeolite ends, a zeolite which is generated when the zeolite is synthesized solely from the reaction mixture, that is, the MFI-type zeolite starts to be generated and to grow, whereby the proportion of the target MTW-type zeolite decreases. The time for which only the target MTW-type zeolite is stably present as a monophase varies with the temperature and is not long in general. In order to obtain the target MTW-type zeolite as a monophase, heating is completed before the generation and growth of the MFI-type zeolite starts such that the sealed container is cooled to end the reaction. Even when a trace of a zeolite as an impurity is also generated, this does not markedly impair the characteristics of the target MTW-type zeolite, and such a zeolite is sufficiently durable in use.

By the heating, crystals of the target MTW-type zeolite are obtained. After the heating ends, the generated crystal powder is filtered so as to be separated from the mother liquor and then washed with water or warm water, followed by drying. The obtained MTW-type zeolite crystals do not need to be baked since they do not contain an SDA in the dried state. If the crystals are dehydrated, they can be used as an adsorbent or the like. Moreover, when the crystals are used as a solid acid catalyst, for example, $Na^+$ ions in the crystals are exchanged with $NH_4^+$ ions, and then the crystals are baked, whereby the crystals can be used as an $H^+$-type.

The MTW-type zeolite obtained by this production method can be preferably used as, for example, an adsorptive separating agent in various industrial fields or as a catalyst in the field of petrochemical industry, by utilizing the large pore diameter or pore volume thereof or the characteristics of solid acid.

EXAMPLES

Hereinafter, the present invention will be described in more detail based on examples, but the scope of the present invention is not limited to these examples. Unless otherwise specified, "%" means "% by mass".

Example 1

(1) Synthesis of Seed Crystal of Beta-Type Zeolite

Figure 4:
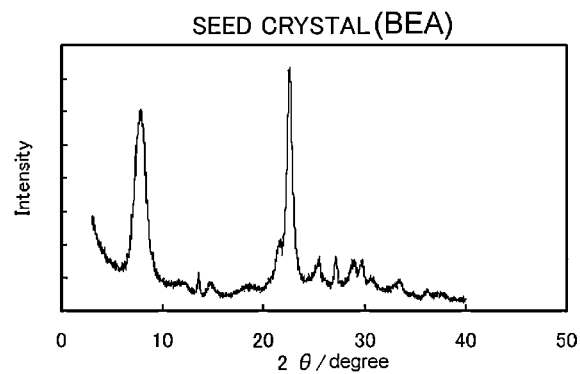
FIG. 4 is an X-ray diffraction diagram of a seed crystal of a beta-type zeolite used in examples and comparative examples.

By a conventionally known method that uses tetraethylammonium hydroxide as an SDA, sodium aluminate as an alumina source, and fine powdery silica (Cab-O-sil, M-5) as a silica source, heating under stirring was performed over 96 hours at 165° C., thereby synthesizing a beta-type zeolite having a ratio of $SiO_2/Al_2O_3$ of 24.0. The zeolite was baked for 10 hours at 550° C. in an electric furnace under an air flow, thereby producing crystals of a beta-type zeolite not containing an SDA. The crystals were observed with a scanning electron microscope, and as a result, the average particle size thereof was 280 nm, and a ratio of $SiO_2/Al_2O_3$ was 24.0. The X-ray diffraction diagram of the beta-type zeolite having undergone baking is shown in FIG. 4. In this manner, the seed crystal of a beta-type zeolite not containing an SDA was obtained.

Figure 5:
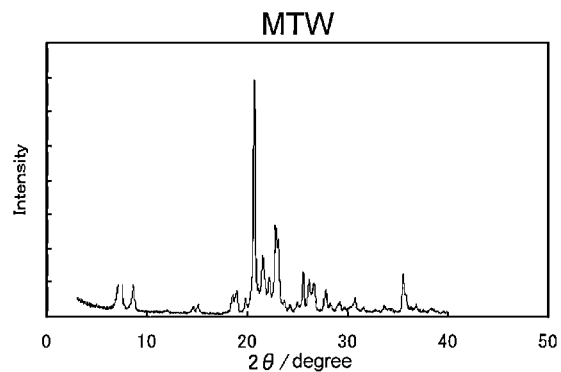
FIG. 5 is an X-ray diffraction diagram of an MTW-type zeolite obtained in Example 1.

(2) Synthesis of MTW-Type Zeolite 0.290 g of sodium aluminate and 1.973 g of 36% sodium hydroxide were dissolved in 10.833 g of pure water, thereby obtaining an aqueous solution. A mixture of 4.904 g of fine powdery silica (Cab-O-sil, M-5) and 0.490 g of the seed crystal was added to little by little and mixed with the aqueous solution under stirring, thereby obtaining a reaction mixture having the composition described in the following Table 1. The reaction mixture had a composition that generated plural compounds including an MFI-type zeolite when a zeolite was synthesized solely from the reaction mixture. A mixture of the reaction mixture and the seed crystal was put into a 60 cc closed container made of stainless steel and heated in a static state under the autogeneous pressure over 4 days at 165° C. without being matured and stirred. After the closed container was cooled, the product was filtered and washed with warm water, thereby obtaining white powder. The X-ray diffraction diagram of the product is shown in FIG. 5. As shown in the diagram, the product was confirmed to be an MTW-type zeolite not containing impurities. The ratio of $SiO_2/Al_2O_3$ of the obtained MTW-type zeolite was calculated. The method was as follows. The MTW-type zeolite was dissolved in potassium hydroxide (KOH), and the solution was analyzed using ICP to determine the amount of Al and Si. Based on the determined amount of Si and Al, the ratio of $SiO_2/Al_2O_3$ was calculated.

Examples 2 to 10

Figure 6:
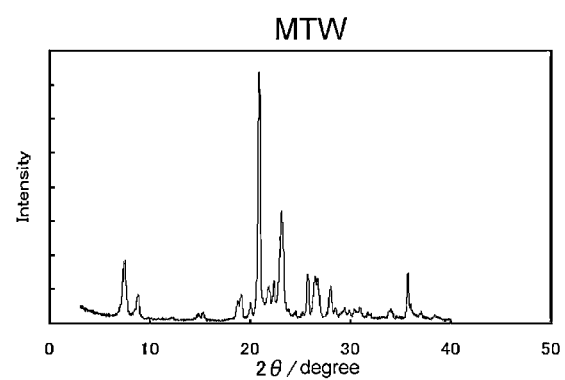
FIG. 6 is an X-ray diffraction diagram of an MTW-type zeolite obtained in Example 5.
Figure 7:
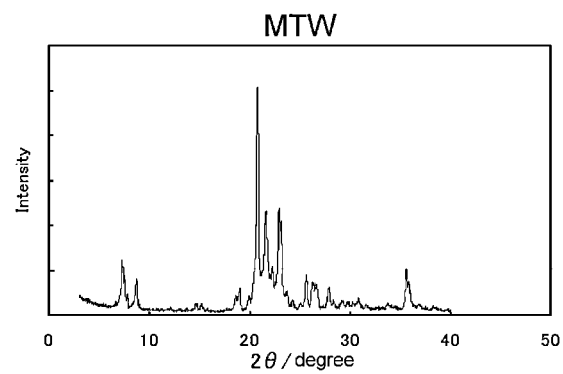
FIG. 7 is an X-ray diffraction diagram of an MTW-type zeolite obtained in Example 7.

MTW-type zeolites were synthesized in the same manner as in Example 1, except that the conditions described in the following Table 1 were employed. As a result of X-ray diffraction analysis, the products were confirmed to be MTW-type zeolites. The X-ray diffraction diagrams of the MTW-type zeolites obtained in Examples 5 and 7 are shown in FIGS. 6 and 7. The reaction mixture used in each example had a composition that generated plural compounds including an MFI-type zeolite when a zeolite was synthesized solely from the reaction mixture.

Comparative Example 1

In this comparative example, a zeolite was synthesized without using the seed crystal of a beta-type zeolite. 0.202 g of sodium aluminate and 2.161 g of 36% sodium hydroxide were dissolved in 11.374 g of pure water, thereby obtaining an aqueous solution. 4.264 g of fine powdery silica (Cab-O-Sil, M-5) was added to little by little and mixed with the aqueous solution under stirring, thereby obtaining a reaction mixture having the composition described in the following Table 2. The reaction mixture was put into a 60 cc closed container made of stainless steel and heated in a static state under the autogeneous pressure over 144 hours at 165° C. without being matured and stirred. After the closed container was cooled, the product was filtered and washed with warm water, thereby obtaining white powder. As a result of X-ray diffraction analysis performed on the product, the product was confirmed to be a mixture of ZSM-5 (MFI-type zeolite), layered silicate, and mordenite.

Comparative Examples 2 to 5

In Comparative examples 2 to 5, zeolites were synthesized without using the seed crystal of a beta-type zeolite, just like Comparative example 1. The conditions of zeolite synthesis are as shown in the following Table 2. The X-ray diffraction analysis was performed on the obtained product to identify the product. The results are also shown in Table 2.

TABLE 1

| | Composition of reaction mixture | | | | Seed crystal | | Heating | | Product | |
| --- | --- | --- | --- | --- | --- | --- | --- | --- | --- | --- |
| Example | $SiO_2/Al_2O_3$ | $Na_2O/SiO_2$ | $H_2O/SiO_2$ | $SiO_2/Al_2O_3$ | Average particle size (nm) | Added amount (based on silica component, % by mass) | Temperature (° C.) | Time (h) | zeolite | $SiO_2/Al_2O_3$ |
| 1 | 80 | 0.125 | 8.3 | 24.0 | 280 | 10 | 165 | 96 | MTW-type zeolite | 39.2 |
| 2 | 80 | 0.150 | 10 | 24.0 | 280 | 10 | 165 | 96 | MTW-type zeolite | |

TABLE 1-continued

| Example | Composition of reaction mixture | | | | Seed crystal | | Heating | | Product | |
| --- | --- | --- | --- | --- | --- | --- | --- | --- | --- | --- |
| | $SiO_2/Al_2O_3$ | $Na_2O/SiO_2$ | $H_2O/SiO_2$ | $SiO_2/Al_2O_3$ | Average particle size (nm) | Added amount (based on silica component, % by mass) | Temperature (°C.) | Time (h) | zeolite | $SiO_2/Al_2O_3$ |
| 3 | 80 | 0.175 | 11.7 | 24.0 | 280 | 10 | 165 | 80 | MTW-type zeolite | 15.9 |
| 4 | 100 | 0.125 | 8.3 | 24.0 | 280 | 10 | 165 | 96 | MTW-type zeolite | |
| 5 | 100 | 0.150 | 10 | 24.0 | 280 | 10 | 165 | 96 | MTW-type zeolite | 40.0 |
| 6 | 100 | 0.175 | 11.7 | 24.0 | 280 | 10 | 165 | 96 | MTW-type zeolite | |
| 7 | 120 | 0.125 | 8.3 | 24.0 | 280 | 10 | 165 | 96 | MTW-type zeolite | 59.8 |
| 8 | 120 | 0.150 | 10 | 24.0 | 280 | 10 | 165 | 96 | MTW-type zeolite | |
| 9 | 120 | 0.175 | 11.7 | 24.0 | 280 | 10 | 165 | 80 | MTW-type zeolite | 21.7 |
| 10 | 160 | 0.150 | 10 | 24.0 | 280 | 10 | 165 | 96 | MTW-type zeolite + layered silicate | |

TABLE 2

| Comparative example | Composition of reaction mixture | | | | Seed crystal | | Reaction condition | | Product zeolite |
| --- | --- | --- | --- | --- | --- | --- | --- | --- | --- |
| | $SiO_2/Al_2O_3$ | $Na_2O/SiO_2$ | $H_2O/SiO_2$ | $SiO_2/Al_2O_3$ | Average particle size (nm) | Added amount (based on silica component, % by mass) | Temperature (°C.) | Time (h) | |
| 1 | 100 | 0.150 | 10 | — | — | 0 | 165 | 144 | ZSM-5 + layered silicate + mordenite |
| 2 | 80 | 0.125 | 8.3 | — | — | 0 | 165 | 336 | ZSM-5 + mordenite |
| 3 | 80 | 0.175 | 11.7 | — | — | 0 | 165 | 336 | ZSM-5 + mordenite |
| 4 | 60 | 0.200 | 13.3 | — | — | 0 | 165 | 168 | ZSM-5 + mordenite |
| 5 | 60 | 0.150 | 10 | — | — | 0 | 165 | 168 | ZSM-5 + mordenite |

The invention claimed is:

1. A method for producing a MTW-type zeolite, comprising:
providing a reaction mixture containing a silica source, an alumina source, an alkali source, and water with a seed crystal of a zeolite, wherein the reaction mixture does not contain a structure directing agent; wherein the seed crystal is added to the reaction mixture in a proportion of 0.1% by mass to 20% by mass based on a silica component in the reaction mixture; and
heating the reaction mixture at 100° C. to 200° C. in a sealed state,
wherein without the seed crystal, the reaction mixture produces a MFI-type zeolite, and
wherein the seed crystal is a beta-type zeolite that has a molar ratio of $SiO_2/Al_2O_3$ of 8 to 50 and does not contain a structure directing agent.

2. The method according to claim 1,
wherein the reaction mixture has a composition represented by the following molar ratio;

$SiO_2/Al_2O_3$=10 to 150

$Na_2O/SiO_2$=0.075 to 0.23

$H_2O/SiO_2$=5 to 50.

3. The method according to claim 2,
wherein the reaction mixture has a composition represented by the following molar ratio:

$SiO_2/Al_2O_3$=30 to 120

$Na_2O/SiO_2$=0.1 to 0.2

$H_2O/SiO_2$=8 to 20.

4. The method according to claim 1,
wherein the reaction mixture to which the seed crystal has been added is heated at 120° C. to 180° C. in a sealed state.

5. The method according to claim 1,
wherein the reaction mixture is matured at 20° C. to 100° C. before being heated.

6. The method according to claim 1, wherein the reaction mixture is stirred during heating in a sealed state.

* * * * *

UNITED STATES PATENT AND TRADEMARK OFFICE
CERTIFICATE OF CORRECTION

PATENT NO.        : 8,834,836 B2
APPLICATION NO.   : 13/980765
DATED             : September 16, 2014
INVENTOR(S)       : Keiji Itabashi et al.

It is certified that error appears in the above-identified patent and that said Letters Patent is hereby corrected as shown below:

ON THE TITLE PAGE:

At item (73), Assignee, change:
"(73) Assignee: Unizeo Co., Ltd, Tokyo (JP)"
to
--(73) Assignee: Unizeo Co., Ltd, Tokyo (JP)

The University of Tokyo, Tokyo (JP)--.

Signed and Sealed this
Eleventh Day of August, 2015

Michelle K. Lee
*Director of the United States Patent and Trademark Office*